United States Patent
Eadon et al.

(10) Patent No.: US 7,870,174 B2
(45) Date of Patent: Jan. 11, 2011

(54) REFERENCE PARTITIONED TABLES

(75) Inventors: George Eadon, Nashua, NH (US); Eugene Inseok Chong, Concord, MA (US); Shrikanth Shankar, Los Altos, CA (US); Ananth Raghavan, San Francisco, CA (US); Jagannathan Srinivasan, Nashua, NH (US); Souripriya Das, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 375 days.

(21) Appl. No.: 11/974,084

(22) Filed: Oct. 11, 2007

(65) Prior Publication Data

US 2009/0100089 A1    Apr. 16, 2009

(51) Int. Cl.
    *G06F 17/30* (2006.01)
(52) U.S. Cl. ....................... 707/953; 707/954
(58) Field of Classification Search ................ 707/705, 707/713, 714, 953, 954
    See application file for complete search history.

(56) References Cited

U.S. PATENT DOCUMENTS

| | | | |
|---|---|---|---|
| 6,092,061 A | 7/2000 | Choy | |
| 6,453,314 B1 * | 9/2002 | Chan et al. | 1/1 |
| 6,460,043 B1 * | 10/2002 | Tabbara et al. | 1/1 |
| 6,785,673 B1 * | 8/2004 | Fernandez et al. | 1/1 |
| 7,366,716 B2 * | 4/2008 | Agrawal et al. | 707/3 |
| 2006/0253473 A1 * | 11/2006 | Agrawal et al. | 707/100 |
| 2008/0201296 A1 * | 8/2008 | Yu et al. | 707/2 |

* cited by examiner

*Primary Examiner*—Jean M Corrielus
(74) *Attorney, Agent, or Firm*—Kraguljac + Kalnay, LLC

(57) ABSTRACT

Systems, methodologies, media, and other embodiments associated with supporting reference partitioned tables in a relational database are described. One example method includes identifying a partitioning strategy (e.g., range, list, hash) associated with a parent table that is related to a child table by a referential constraint. The example method may also include creating the child table to be a reference-partitioned table partitioned according to the partitioning strategy associated with the parent table. The example method may also include creating the child table to be equi-partitioned with respect to the parent table. The child table is not to replicate a partition key of the parent table but rather is to inherit a partitioning key associated with the parent table through a foreign key relationship.

36 Claims, 7 Drawing Sheets

REFERENCE PARTITIONED TABLES

BACKGROUND

Some enterprises may run very large databases. For example, some databases may store hundreds of gigabytes (GB) of data, and in some cases may even store terabytes (TB) of data. Database sizes are expected to continue to grow even larger. Supporting and maintaining these ever expanding databases may be difficult. One tool to simplify support and maintenance is partitioning. Partitioning facilitates managing large volumes of data by providing one logical view to applications while providing multiple physical segments for administration.

Partitions may share the same logical attributes as the table from which they were created. These logical attributes may include column definitions, number of columns, constraint definitions, and so on. Partitioning schemes may include, for example, range partitioning, hash partitioning, list partitioning, and so on. Range partitioning may map rows to partitions based on ranges of column values. Date ranges, age ranges, GPA ranges, and so on are commonly used in range partitioning. Hash partitioning maps rows based on a hash function. This may be useful when range partitioning is unavailable. List partitioning may be implemented by providing an explicit list of which rows are to be placed in which partitions.

Partitioning is not restricted to data tables. Indexes may also be partitioned. A local index may be constructed so that it reflects the structure of an underlying table. Therefore, it may be equi-partitioned with its underlying table and may be partitioned on the same columns as its underlying table.

Partitioning allows large database tables and indexes to be decomposed into smaller, more manageable pieces called partitions. A database management system (DBMS) may allow structured query language (SQL) queries and data manipulation language (DML) statements to access these partitions without being modified. A DBMS may also allow data definition language (DDL) statements to access and manipulate individual partitions rather than entire tables or indexes. Thus, for at least SQL, DML and DDL, partitioning may be transparent.

Partitioning may also be transparent to applications. Applications that manage large volumes of data (e.g., online transaction processing (OLTP) systems, data warehousing systems) may benefit from improved performance, manageability, and availability when partitioned. Thus, given a set of database tables related by referential constraints, a user may wish to equi-partition the tables. An equi-partitioned table is a partitioned table having the same number of partitions as an original table, where a row in the equi-partitioned table is mapped to the partition corresponding to the partition containing its parent row (with respect to the referential constraint) in the original table. Conventionally, equi-partitioning a table required replicating the partitioning key across all tables. Conventionally, equi-partitioning a table also required explicitly and/or manually maintaining the equi-partitioning across partition maintenance operations (PMO)s (e.g., alter table split partition). Conventionally, equi-partitioning a table also required explicitly and/or manually maintaining the equi-partitioning in the face of row migrations between partitions in the original table.

The next two paragraphs provide a review of some basic database concepts. A database may be considered to be a structured collection of inter-related data organized into tables that are stored in a physical location with specific table names and specific column names. A database schema may define objects that are represented in the database. This definition may include a structural description of facts held in the database. Database tables may be accessed using a query language (e.g., SQL). The result of a query may be stored as a logical table referred to as a view. A stored procedure is a group of SQL statements that are stored together as a named set in a database. The named set can be executed as a group by a DBMS. A stored procedure may populate a view. Triggers are stored procedures that may execute automatically upon the occurrence of a certain condition. For example, when a row is added to a database table a trigger may execute. Similarly, when a row is deleted or modified, a trigger may execute.

A constraint may restrict the type of data that can be stored in a database table and/or in a field in a database table. For example, a constraint may require that a certain field be NOT NULL, meaning it must have a value. Another example constraint may require that a certain field contain only upper case letters. Constraints may be associated with keys. For example, a primary key constraint may require that no row have a duplicate value in the primary key. A foreign key is a reference to another key in another table. A foreign key may be used to declare referential integrity constraints. For example, a referential integrity constraint may assert that the value of a foreign key must be taken from a primary key in another table.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
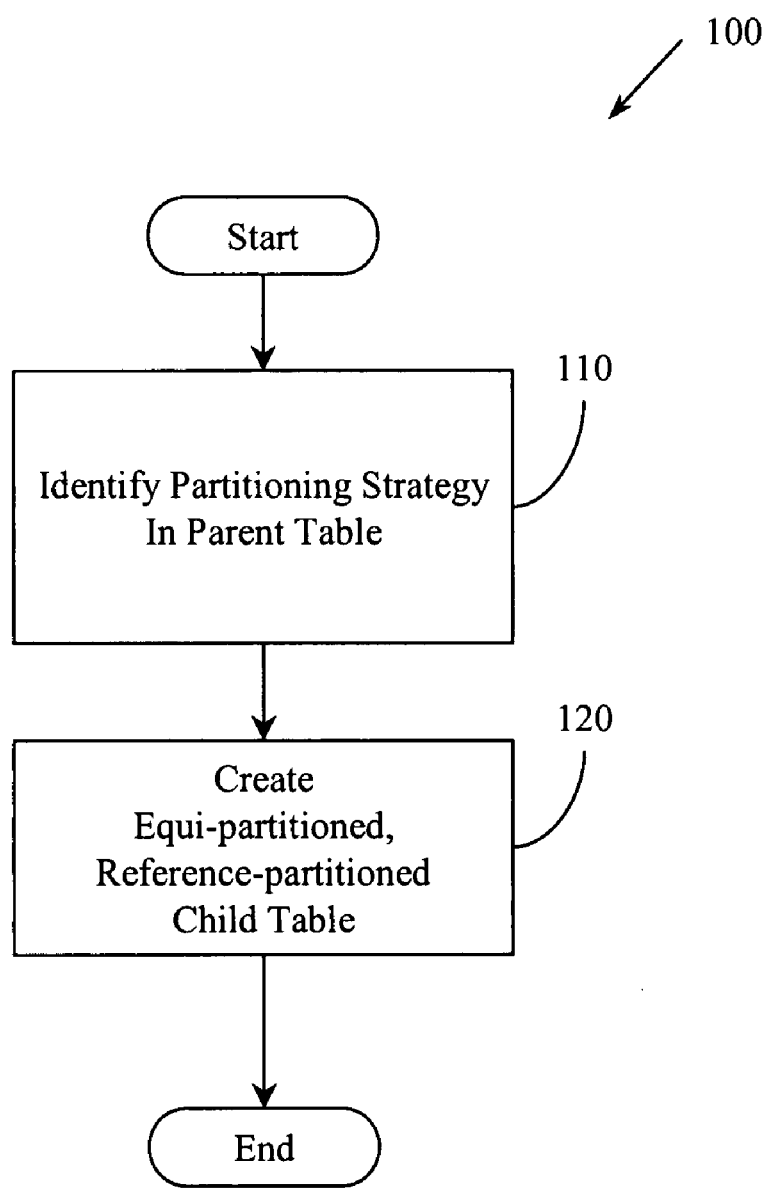
FIG. 1 illustrates an example method associated with reference partitioned tables in a relational database.

Example systems and methods support partitioning a child table at creation time based, at least in part, on the partitioning of a parent table. The child may be related to the parent by a referential constraint. Thus, example systems and methods support reference partitioning a child table based on the partitioning scheme of a parent table referenced by a referential constraint. For example, if a parent table is range partitioned, then a child table can be created and can be partitioned based on the range partitioning of the parent table. In one example, the child table may be equi-partitioned with respect to the parent table. In reference partitioning, a child table inherits the partitioning strategy of the parent table through a parent/foreign key relationship. Before reference partitioning, redundant storage of duplicate information was used to relate tables sharing the same partitioning strategy. See, for example, FIG. 6 where a partition key data 620 in a first table 600 is replicated as partition key data 630 in a second table 610. With reference partitioning, the partition key can be inherited through a parent/foreign key relationship. See, for example, FIG. 7 where a partition key data 720 in a first table 700 is not replicated in a second table 710.

Example systems and methods may be employed in information lifecycle management (ILM) systems that partition data at the business object level. This may facilitate applying data retention and archival policies to a business object as a unit, for example. ILM may be viewed as a data management strategy that reduces the cost of retaining data by providing a set of policies and techniques for managing data.

Recall that different tables in a relational database can be related by common columns and that rules may exist to govern the relationship of the columns. Referential integrity rules preserve relationships between tables. For example, a referential integrity constraint may require that for a row in a child table, the value in its foreign key is to match a value in the parent key of the parent table. More generally, referential integrity concerns ensuring that a database only contains valid data. One premise of referential integrity is that rules can be defined to govern data to be stored in a database. When data is to be added, a referential integrity constraint can be analyzed before allowing the data to be stored.

A check constraint enforces values that are to go into a table. For example, a check constraint may require that a certain value be positive. Referential constraints are rules that define the relationship between two tables. For example, a first pair of tables may have a one to many relationship while a second pair of tables may have a many to many relationship. A referential constraint will guarantee that table operations performed will not lead to a violation of the defined relationship between tables. Thus, a referential constraint may enforce a rule about what can go in one table based on its relationship with another table. A referential constraint may also enforce a rule about what can be done to one table based on its relationship with another table.

In one example, systems and methods described herein may reference partition a table if certain conditions are met. These conditions may be checked before a reference partitioned table is created and, if not met, the table may not be created. The first condition is that the table be a heap-organized table that is not a domain index storage table. The second condition is that the parent table is partitioned using one of, range partitioning, list partitioning, hash partitioning, system partitioning, composite partitioning, and reference partitioning. The third condition is that row movement be enabled for the table if row movement is enabled for the parent table. The fourth condition concerns a foreign key constraint between a parent table and a child table. For the foreign key constraint to be used as a basis for reference partitioning, in one example it should satisfy four conditions. Once again, if the four conditions are not met, then the table may not be created. The first condition is that the foreign key is not a self-referential constraint. The second condition is that foreign key columns are constrained to be not NULL. The third condition is that the foreign key constraint does not have DELETE SET NULL semantics. The fourth condition is that there are no virtual columns in either the parent key or the foreign key. After a reference partitioned table is created, the foreign key constraint used as a basis for reference partitioning cannot be dropped or altered. Also, the constraints that enforce that the foreign key columns are NOT NULL cannot be dropped or altered. Also, row movement can not be disabled for the reference partitioned table if it is enabled for the parent table. Also, row movement can not be enabled for the parent table if it is disabled for the reference partitioned table.

A reference partitioned table may support many database features and functionalities. For example, a reference partitioned table may support non-unique local indexes (e.g., B-tree, bitmap). A reference partitioned table may also support unique and non-unique range/hash partitioned global and non-partitioned indexes. A reference partitioned table may also support DML. A reference partitioned table may also support partition-wise joins for foreign-key joins between a reference partitioned table and its parent. A reference partitioned table may also, under certain conditions, support partition-wise joins with tables other than its parent. A reference partitioned table may also support partition pruning for queries involving predicates on the partitioning foreign key. A reference partitioned table may also support GROUP BY pushdown when the group by key is a superset of the table's partitioning key. A reference partitioned table may also support ORDER BY pushdown if some parent referenced key columns are also part of the parent table's partitioning key. A reference partitioned table may also support referential constraints in addition to the referential constraint used as a basis for reference partitioning. While a number of features and functionalities are described, it is to be appreciated that a reference partitioned table may, additionally and/or alternatively, support other features and functionalities as well.

As described above, a reference partitioned table may support partition pruning. This section describes three approaches for partition pruning in reference partitioned tables. While three approaches are described, it is to be appreciated that example systems and methods may employ a greater and/or lesser number of approaches. One approach arises when the set of partition key columns in the table's non-reference partitioned ancestor is duplicated in the reference partitioned table and its reference partitioned ancestors, and members of the set of partition key columns is included in the foreign and referenced keys for the reference partitioned table and its reference partitioned ancestors. In this case, predicates on the foreign key of the reference partitioned table may be mapped to predicates on the partition key of its non-reference partitioned ancestor table. Additionally, the partition mapping descriptor of the non-reference partitioned ancestor table may partition prune the reference partitioned table. Another approach arises when equality predicates or IN-list predicates are present on foreign key columns. In this case, partition pruning may include probing a parent key index, finding a row identifier for the parent key, extracting a data object number from the row identifier, mapping the data object number to a partition in the parent table and pruning the associated partition in the child table. A third approach may arise when there are some predicates on foreign key columns but neither of the first two cases described above exist. In this case, a query may be run against the parent table. The query may include the predicates on the foreign key columns and thus the query may yield a partition number for a partition that includes data selected by the predicates. The associated partitions in the child table may then be selectively pruned based, for example, on performance cost comparisons.

Example systems and methods may block a partition maintenance operation (PMO) that alters the partitioning scheme from running directly against a reference partitioned table. Some PMOs that may be blocked include, for example, SPLIT, MERGE, ADD [range/list], DROP [range/list], ADD

[hash], COALESCE [hash], and so on. Example systems and methods may allow a PMO operation that does not alter the partitioning scheme to be applied against reference partitioned tables. Some PMOs that may not be blocked include, for example, MOVE, TRUNCATE, EXCHANGE, and so on. A drop operation may remove a partition, including its data and metadata. A truncate operation may provide fast data removal while preserving metadata. An exchange operation provides the ability to exchange a partition with a standalone table.

Example systems and methods may handle PMOs on parent tables associated with reference partitioned tables as follows. Some PMOs that alter the partitioning scheme will be cascaded atomically and automatically to relevant reference partitioned child tables. Some of these PMOs may even cascade recursively to reference partitioned descendant tables as a single atomic operation. Some PMOs that may be cascaded include, for example, SPLIT, MERGE, ADD(hash), COALESCE(hash), ADD(range/list), DROP, and so on. In one example, a PMO that cascades to a child table may have an option to specify attributes for new partitions in the child table. Similarly, a PMO that cascades to a child table may also have an option to specify attributes for new local index partitions for the child table.

To facilitate the atomicity of PMO operations, an operation may be performed "top-down", where the operation is first performed on the parent and then performed on the child. Additionally, neither operation may be committed until both operations are complete. When a PMO causes data movement in the parent table, (e.g., split, add [hash], coalesce, merge), then example systems and methods may also cause data movement to automatically occur in the child. In one example, a temporary table may be created for a parent table that has a partition by reference child table. When a PMO is performed on the parent, the temporary table is populated with a log that tracks how the PMO redistributes rows among the affected partitions. Then, to process the child, a join between the temporary table and the child table on the partition key (e.g., foreign key) may occur. From this join, partition information (e.g., the row-to-partition mapping associated with redistributing rows among partitions in the child table) may be acquired. The partition information may then be used to maintain equi-partitioning.

Example systems and methods also facilitate placing a row in a child table partition based on the parent table row. Placing a row in a child table partition may be performed after using the foreign key value of the child table row to determine a partition number of the parent table to which the referenced key belongs. The child table row may then be placed in the corresponding partition of the child table. Updates to parent table rows causing row movement may be automatically and atomically cascaded to child table rows.

Figure 6:
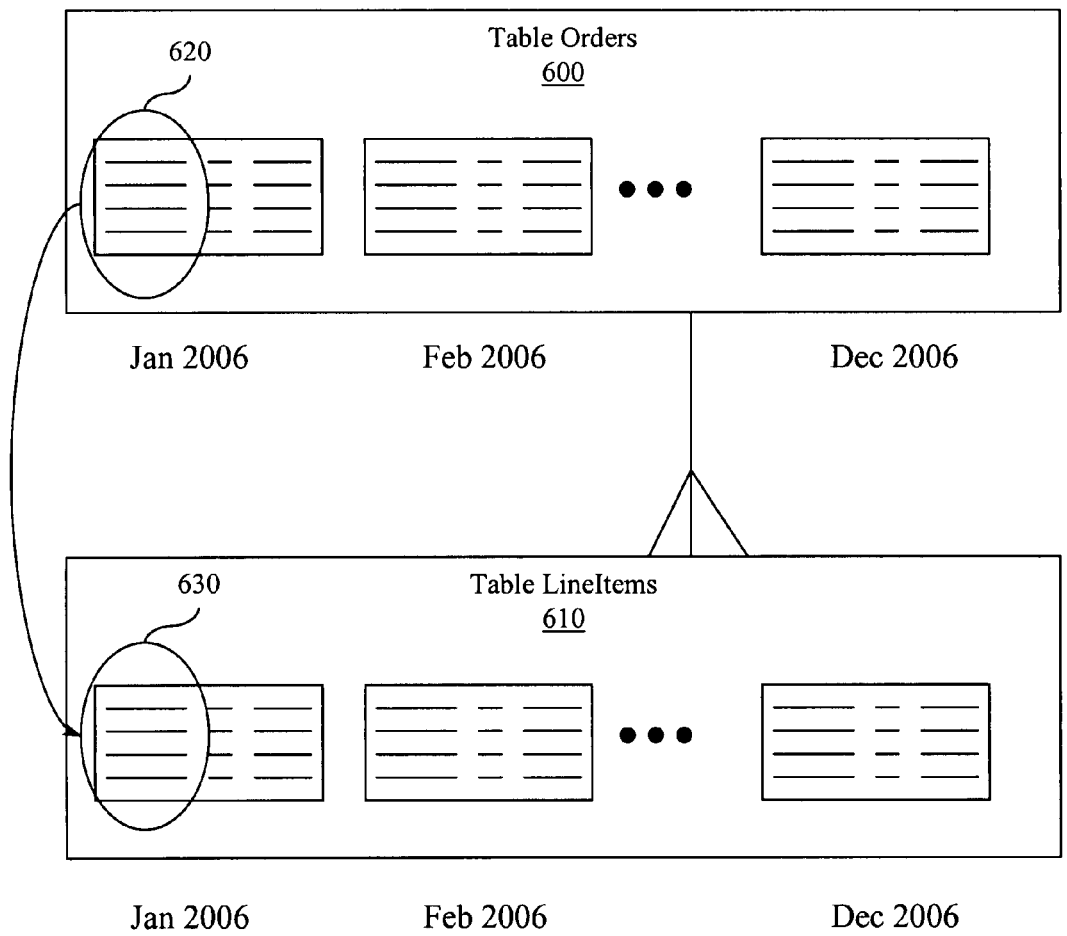
FIG. 6 illustrates duplication of a partition key.
Figure 7:
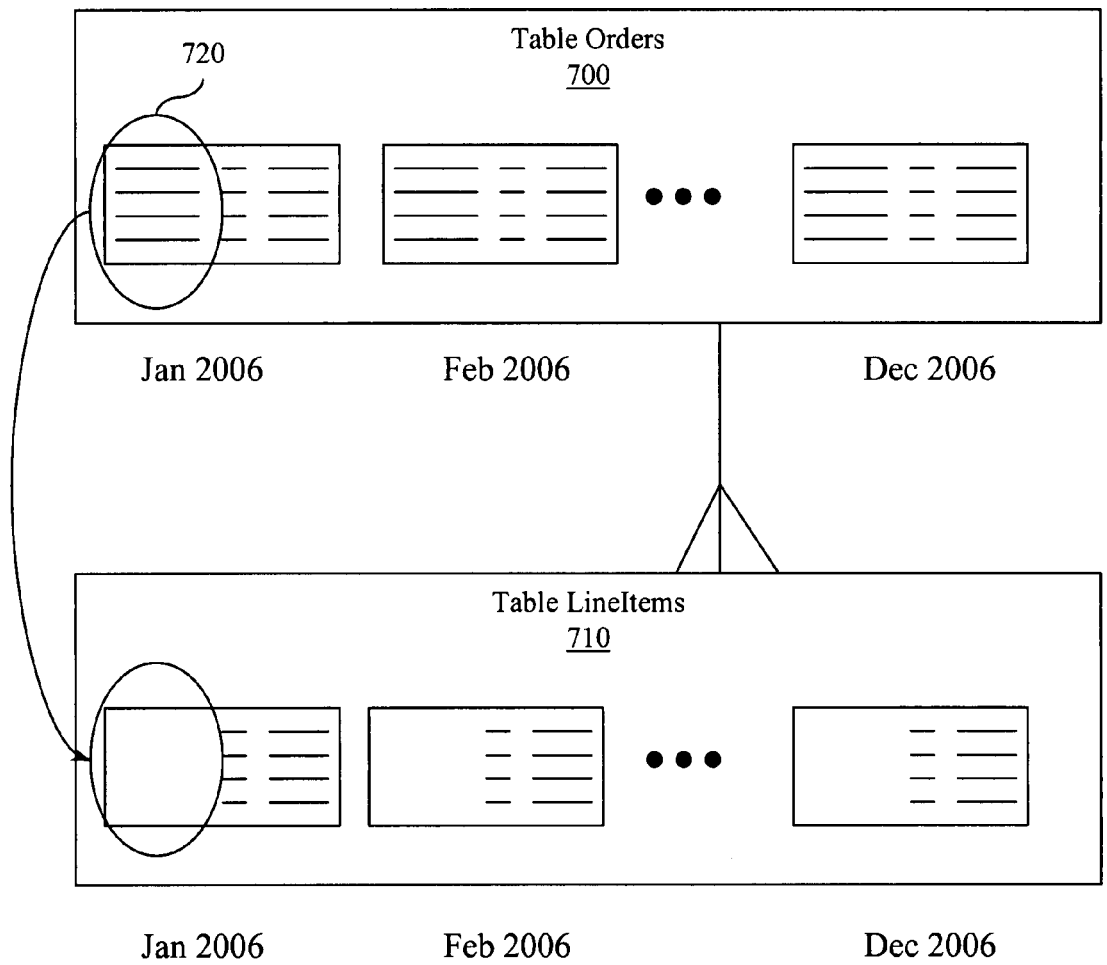
FIG. 7 illustrates a partition key being inherited by a parent/foreign key relationship.

By using the foreign key to determine the partition number associated with a row in a parent table, a child table does not need to replicate a partition key from the parent table. FIG. 6 illustrates a conventional approach to support equi-partitioning a child table. In this conventional approach, a partitioning key is replicated in the child table. FIG. 7 illustrates an example approach to support reference-partitioning a child table. The example approach relies on the parent/foreign key relationship to allow the partition key of the parent to be inherited into the child table thereby removing the need to replicate the partition key data.

In one example, a link between a reference-partitioned table and its parent may be encoded via a flag (e.g., value) in the partitioning constraint metadata. Given a reference-partitioned table, its partitioning constraint can be found by scanning its referential constraint metadata and using the flag to identify the partitioning constraint. Once the referential constraints have been scanned and the partitioning constraint has been found, then ordinary metadata associated with the referential constraint can identify the parent table. Note that this flag is related to dictionary metadata that exists after table creation and is not part of the CREATE TABLE syntax.

In one example, to create a reference partitioned table, a CREATE TABLE statement may be augmented with a PARTITION BY REFERENCE clause. The CREATE TABLE statement may be, for example, an SQL statement. The additional clause may identify a referential constraint linking the child table to be created to the existing parent table. As described above, the referential constraint linking the child table and the parent table may be augmented with information that facilitates identifying the partitioning key in the parent table. This information can be used to partition the child table without requiring the partitioning key to be replicated in the child table.

Creating a reference partitioned table may include ensuring that certain conditions are satisfied before the table is created. For example, a condition requiring that the partitioning referential constraint is enabled, validated, and not deferrable, may be imposed. Additionally, a condition requiring columns of the partitioning foreign key to be constrained to be NOT NULL by enabled, validated, and not deferrable constraints, may be imposed. Additionally, a condition requiring that no columns of the partitioning foreign key are virtual columns may be imposed. Similarly, a condition requiring that no columns of the parent key referenced by the partitioning constraint are virtual columns may be imposed. Additionally, a condition that requires that if row movement is enabled in the referenced table then row movement must be enabled in the reference partitioned table may be imposed. Additionally, a condition that the table is not a domain index storage table may be imposed. While this paragraph describes a certain set of conditions, it is to be appreciated that the set of conditions may include a greater and/or lesser number of conditions.

The following example illustrates some aspects of a reference-partitioned table. Consider an orders table created using the following create table statement. The orders table is to be partitioned by range on order_date.

```
CREATE TABLE orders
   ( order_id        NUMBER(12)
   , order_date      TIMESTAMP WITH LOCAL TIME ZONE
   , order_mode      VARCHAR2(8)
   , customer_id     NUMBER(6)
   , order_status    NUMBER(2)
   , order_total     NUMBER(8,2)
   , sales_rep_id    NUMBER(6)
   , promotion_id    NUMBER(6)
   , CONSTRAINT orders_pk PRIMARY KEY(order_id)
   )
PARTITION BY RANGE(order_date)
(PARTITION Q1_2005 VALUES LESS THAN
(TO_DATE('01-APR-2005','DD-MON-YYYY')),
PARTITION Q2_2005 VALUES LESS THAN
(TO_DATE('01-JUL-2005','DD-MON-YYYY')),
PARTITION Q3_2005 VALUES LESS THAN
(TO_DATE('01-OCT-2005','DD-MON-YYYY')),
PARTITION Q4_2005 VALUES LESS THAN
(TO_DATE('01-JAN-2006','DD-MON-YYYY')));
```

Now consider a reference-partitioned child table named order_items that is created using the following create table statement. This order_items table will also be partitioned by range. However, this order_items table will not replicate the partition key (order_date).

```
CREATE TABLE order_items
    ( order_id            NUMBER(12)    NOT NULL
    , line_item_id        NUMBER(3)     NOT NULL
    , product_id          NUMBER(6)     NOT NULL
    , unit_price          NUMBER(8,2)
    , quantity            NUMBER(8)
    , CONSTRAINT order_items_fk
        FOREIGN KEY(order_id) REFERENCES orders(order_id)
    )
PARTITION BY REFERENCE(order_items_fk);
```

The child table will be created with four partitions Q1_2005, Q2_2005 Q3_2005, and Q4_2005. Each partition will contain the order_items rows corresponding to orders in the respective parent partition. Note that the partition key has not been replicated.

Now consider the following INSERT statements that are made to the orders table:

```
INSERT INTO orders (order_id, order_date)
VALUES (1721, TO_DATE('31-MAR-2005','DD-MON-YYYY')); --
partition Q1_2005
INSERT INTO orders (order_id, order_date)
VALUES (1722, TO_DATE('01-APR-2005','DD-MON-YYYY')); --
partition Q2_2005
```

Also consider the following INSERT statements to the order_items table:

```
INSERT INTO order_items (order_id, line_item_id)
VALUES (1721, 1)); -- partition Q1_2005
INSERT INTO order_items (order_id, line_item_id)
VALUES (1721, 2)); -- partition Q1_2005
INSERT INTO order_items (order_id, line_item_id)
VALUES (1722, 1)); -- partition Q2_2005
```

Now consider the following update to the order_date column in orders row:

```
UPDATE orders SET order_date =
    TO_DATE('01-APR-2005','DD-MON-YYYY'))
        WHERE order_id = 1721;
```

This update will cause the row for order_id 1721 to move to partition Q2_2005 in the orders table. Since the child table is reference-partitioned, the corresponding order_items row is also moved automatically in the child table.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Child table", as used herein, refers to one table in a parent/child relationship between tables. The child table is the table in the relationship that includes the foreign key that refers to the referenced key (a.k.a. parent key) in the parent table. A child table is dependent on the values present in the referenced key.

"Foreign key", as used herein, refers to a field from a table that refers to or targets a specific key in another table, usually the primary key in another table. Thus, as applied to reference partitioned tables, a foreign key may be a column or sequence of columns included in the definition of the referential integrity constraint that references a referenced key.

"Partition key", as used herein, refers to a set of columns that store values that determine in which partition a given row is to reside.

"Primary key", as used herein, refers to a field in a table that uniquely identifies records in the table.

"Parent table", as used herein, refers to one table in a parent/child relationship between tables. The parent table is the table that is referenced by the foreign key in the child table. The referenced key in the parent table may determine whether specific inserts or updates are allowed in the child table. "Ancestor table" as used herein, refers to a parent table, a grandparent table, a great-grandparent table, and so on.

"Referenced key", as used herein, refers to the unique key or primary key of the table that is referenced by a foreign key.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, a compact-disk read only memory (CD-ROM), other optical medium, a random access memory (RAM), a read only memory (ROM), a programmable ROM (PROM), or other memory chip or card, a memory stick, and other media from which a computer, a processor or other electronic device can read.

"Logic", as used herein, includes but is not limited to hardware, firmware, software in execution, and/or combinations of each to perform a function(s) or an action(s), and/or to cause a function or action from another logic, method, and/or system. Logic may include a software controlled microprocessor, discrete logic (e.g., an application specific integrated circuit (ASIC)), an analog circuit, a digital circuit, a programmed logic device, a memory device containing instructions, and so on. Logic may include a gate(s), combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities (e.g., processor, operating system, logic, software). Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions in execution that cause a computer, processor, or other electronic device to perform functions, actions and/or behave in a desired manner. The instructions may be embodied in various forms including routines, algorithms, modules, methods, threads, and/or programs including separate applications or code from dynamically linked libraries. Software, whether an entire system or a component of a system, may be embodied as an article of manufacture and maintained or provided as part of a computer-readable medium as defined previously.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on.

It has proven convenient at times, principally for reasons of common usage, to refer to these signals as bits, values, elements, symbols, characters, terms, numbers, or so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, displaying, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various actions occurring in serial, it is to be appreciated that various actions could occur concurrently, substantially in parallel, and/or at substantially different points in time.

The illustrated elements denote "processing blocks" that may be implemented in logic. In one example, the processing blocks may represent executable instructions that cause a computer, processor, and/or logic device to respond, to perform an action(s), to change states, and/or to make decisions. Thus, the described methodologies can be implemented as processor executable instructions and/or operations provided by a computer-readable medium. In another example, the processing blocks may represent functions and/or actions performed by functionally equivalent circuits including an analog circuit, a digital signal processor circuit, an application specific integrated circuit (ASIC), and so on. Flow diagrams illustrate functional information one skilled in the art could use to design/fabricate circuits, generate software, or use a combination of hardware and software to perform the illustrated processing.

FIG. 1 illustrates a method 100 associated with reference partitioned tables in a relational database. Method 100 may include, at 110, identifying a partitioning strategy associated with a parent table. The parent table may be related by a referential constraint to a child table to be created with partition referencing. The referential constraint may identify a foreign key in the child table that is to relate the child table to the parent table. The referential constraint may also identify the parent table and a referenced key in the parent table that is to relate the child table to the parent table. Metadata associated with the parent table may describe the partitioning strategy of the parent table. Thus, identifying the partitioning strategy may, in one example, include analyzing and/or updating the referential constraint.

Method 100 may also include, at 120, creating a child table related to the parent table by the referential constraint. The child table is to be partitioned using the partitioning strategy associated with the parent table. The child table is not to replicate a partition key of the parent table. Instead, the child table is to inherit the partition key through the foreign and referenced keys associated with the referential constraint. In one example, the child table is to be equi-partitioned with respect to the parent table.

Figure 2:
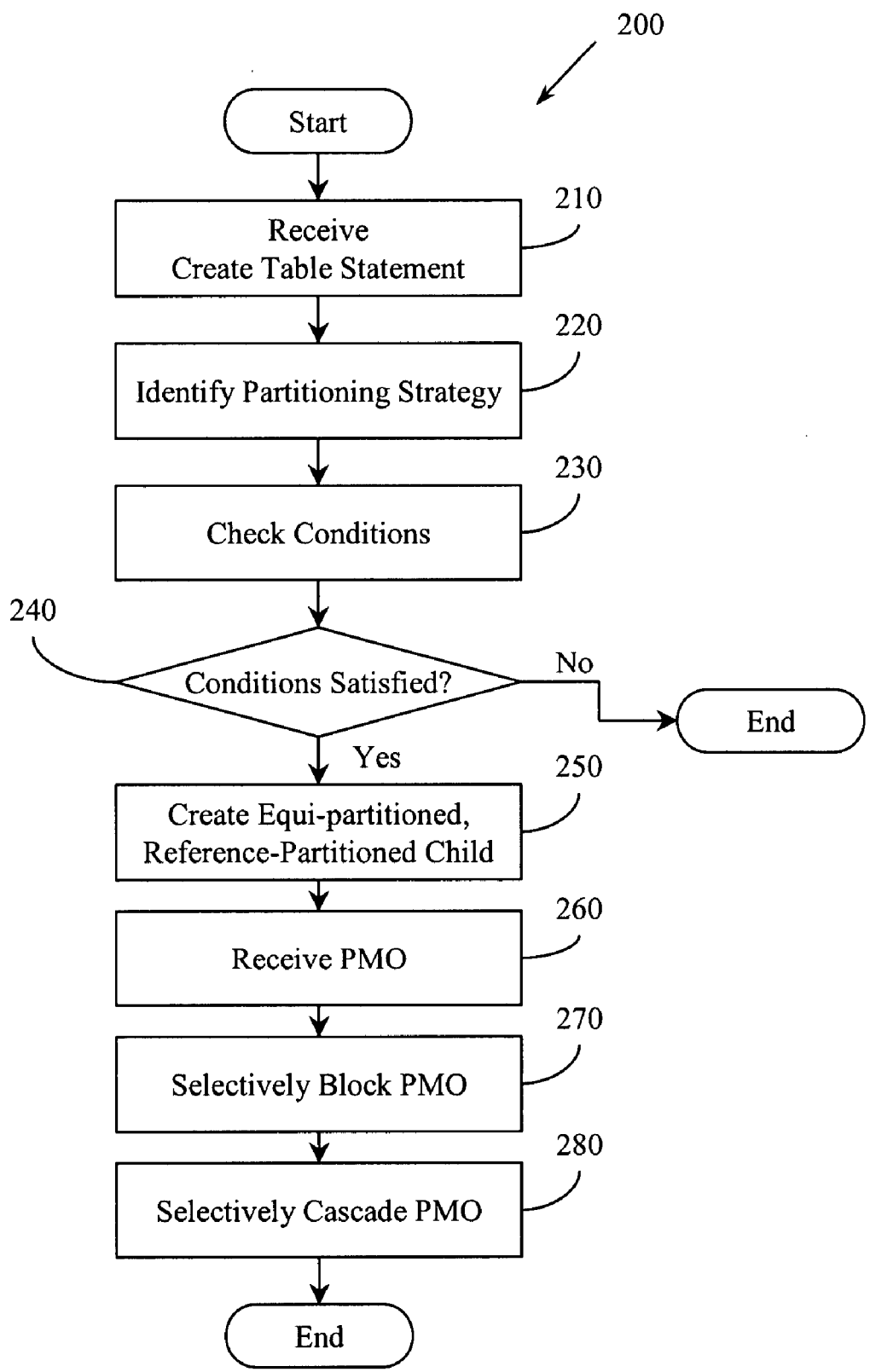
FIG. 2 illustrates an example method associated with reference partitioned tables in a relational database.

FIG. 2 illustrates a method 200 associated with reference partitioning tables in a relational database. FIG. 2 includes some actions similar to those described in connection with method 100 (FIG. 1). For example, method 200 includes identifying a partition strategy at 220 and creating a reference partitioned child table at 250. However, method 200 also includes additional actions.

Method 200 may include, at 210, receiving a create table statement having a partition by reference clause that identifies the referential constraint to be used as the basis for reference partitioning. The parent table may be identified as part of the referential constraint, which facilitates determining the partitioning key and the partitioning strategy associated with the parent table.

Method 200 may also include, at 230, checking conditions before creating the child table and selectively terminating the create table action at 240 based on whether the conditions are satisfied. Conditions to be checked may include, for example, determining that the referential constraint is enabled, validated and not deferrable, determining that columns of a partitioning foreign key are constrained to be not null by enabled, validated, and not deferrable constraints, determining that no columns of the partitioning foreign key are virtual columns, determining that no columns of the parent key referenced by a partitioning constraint are virtual columns, determining that if row movement is enabled in the parent table that row movement is enabled in the child table, determining that the parent table is not a domain index storage table, and so on.

The set of conditions that are checked at 230 and upon which the determination at 240 can be made may, additionally and/or alternatively, include determining that the parent table is heap-organized, and determining that the parent table is range partitioned, list partitioned, hash partitioned, system partitioned, composite partitioned, or reference partitioned. The set of conditions that are checked at 230 and upon which the determination at 240 can be made may relate to a foreign key constraint. For example, the conditions may, additionally and/or alternatively, include determining that the foreign key constraint is not a self-referential constraint, determining that foreign key columns are constrained to be not null, determining that the foreign key constraint does not have delete set null semantics, determining that there are no virtual columns in the parent key, determining that there are no virtual columns in the foreign key, and so on.

Method 200 may also include, at 260, receiving a partition maintenance operation (PMO). The PMO may be associated with the parent table and/or with the child table. Thus, method 200 may also include, at 270, selectively blocking the PMO from operating directly on the child table and, at 280, selectively cascading the PMO from the parent table to the child table. In one example, the PMO is to be performed first in the parent and then in the child. Additionally, neither the PMO performed in the parent nor the PMO performed in the child is to be committed until both of the PMO are complete. Further, certain DDLs on the child table may be blocked. DDLs that may be blocked include attempting to disable the NOT NULL constraints on the foreign key, attempting to disable the referential integrity constraint used as a basis for reference partitioning, attempting to disable row movement for the child table when row movement is enabled for the parent table, and so on.

In one example, automatically cascading to the child table a row migration operation performed on the parent table may include executing a trigger. The trigger may be executed upon determining that the row migration operation has been performed on the parent table. Note that this "trigger" is not a trigger created using CREATE TRIGGER functionality.

Processing the PMO in the parent may include a number of actions. These actions may include, for example, populating a temporary table with a log that tracks where the PMO had an effect in the parent table. The temporary table may have been created when the reference partitioned table was created. With the temporary table and log in hand, the actions may also include performing a join between the temporary table and the child table on the partition key, acquiring partition information from the join, and maintaining equi-partitioning of the child table with respect to the parent table based, at least in part, on the partition information.

While receiving and processing a PMO are described, it is to be appreciated that in another example method 200 may also include receiving and processing a data manipulation language (DML) statement associated with the child table. In one example, processing the DML statement may include probing for a key in the parent index, acquiring a row identifier associated with the key, acquiring a data object number associated with the row identifier, determining a parent table partition associated with the DML statement based, at least in part, on the data object number, determining a child table partition associated with the DML statement based, at least in part, on the parent table partition, and selectively performing the DML statement in the parent table and the child table. In one example, the process may include repetitively probing the index on the parent table and then selectively rolling back and retrying an operation on the child table based, at least in part, on determining whether consecutive values retrieved by probing the index on the parent table are equivalent.

While FIG. 2 illustrates various actions occurring in serial, it is to be appreciated that various actions illustrated in FIG. 2 could occur substantially in parallel. By way of illustration, a first process could receive statements (e.g., create table, PMO), a second process could check conditions, and a third process could control whether PMOs are cascaded or blocked. While three processes are described, it is to be appreciated that a greater and/or lesser number of processes could be employed and that lightweight processes, regular processes, threads, and other approaches could be employed.

Figure 3:
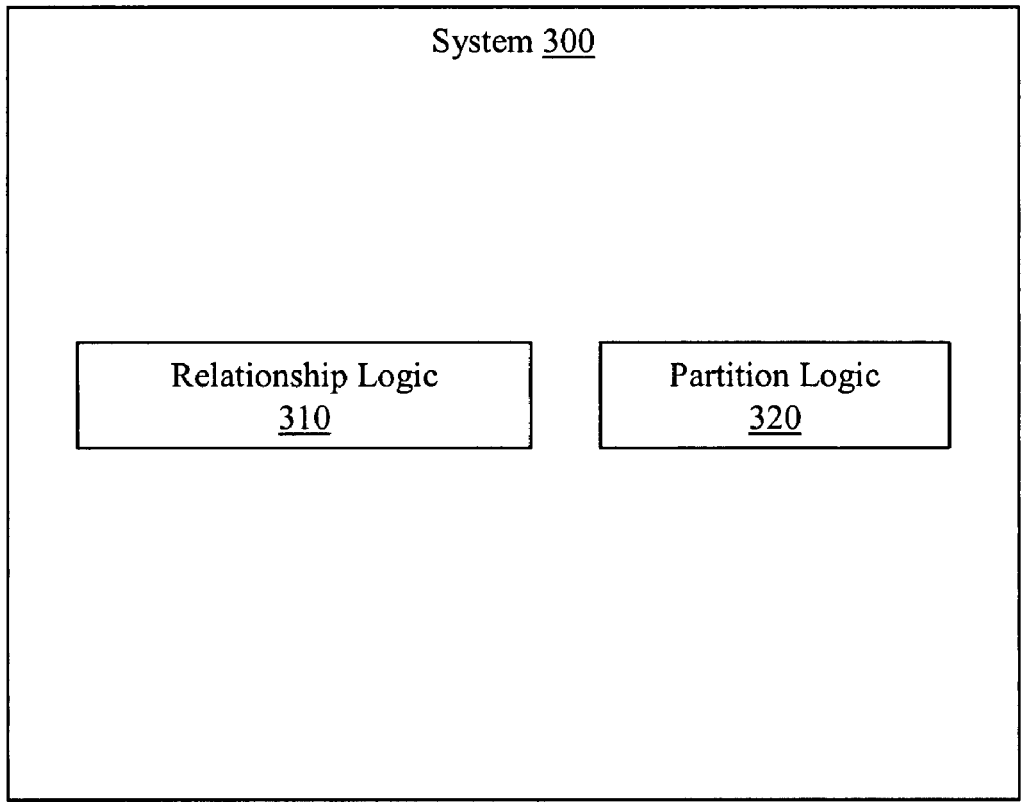
FIG. 3 illustrates an example system associated with reference partitioned tables in a relational database.

FIG. 3 illustrates a system 300 associated with reference partitioned tables in a relational database. System 300 may include a relationship logic 310. Relationship logic 310 may identify a referenced table. The identification may include analyzing a referential constraint that relates the referenced table to a referencing table through a foreign key. The referential constraint may include information about a referenced key in the referenced table. This information can be analyzed by the relationship logic 310 to identify a partition scheme associated with the referenced table.

System 300 may also include a partition logic 320 to reference-partition and equi-partition a referencing table that is related to the referenced table by the referential constraint. Recall that a referential constraint involves a foreign key that is used to relate a referencing table to a referenced table. In one example, partition logic 320 may equi-partition the referencing table with respect to the referenced table. Thus, the referencing table may be partitioned using the same partitioning scheme as the referenced table. Unlike conventional schemes, the referencing table will not include a partitioning key found in the referenced table. Instead, the referencing table will inherit the partitioning key through the foreign key associated with the referential constraint and the parent/foreign key relationship.

Figure 4:
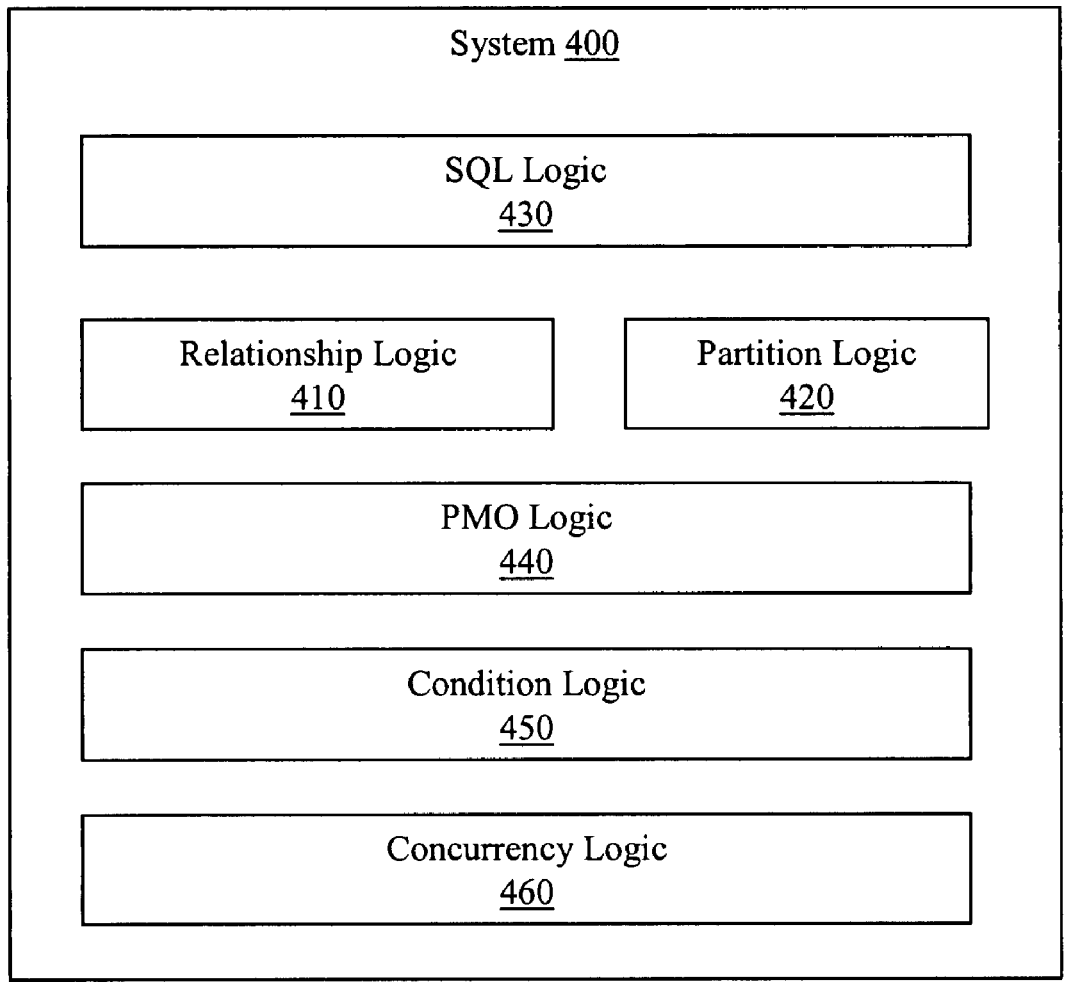
FIG. 4 illustrates an example system associated with reference partitioned tables in a relational database.

FIG. 4 illustrates a system 400 associated with reference partitioning tables in a relational database. FIG. 4 includes some logics similar to those described in connection with system 300 (FIG. 3). For example, system 400 includes a relationship logic 410 and a partition logic 420. However, system 400 includes additional logics.

System 400 may include an SQL logic 430 to receive SQL statements. SQL logic 430 may receive an SQL create table statement that includes a partition by reference clause. The partition by reference clause may identify a referenced table and a referential constraint that relates the referenced table and a referencing table.

System 400 may also include a PMO logic 440. PMO logic 440 may selectively cascade a PMO performed on the referenced table to the referencing table. The PMO logic 440 may automatically and atomically cascade the PMO. The PMO logic 440 may also selectively block a PMO operation from being performed directly on the referencing table.

System 400 may also include a condition logic 450 to selectively control the partition logic 420. The control may be based, at least in part, on determining whether a set of conditions related to the tables and/or the foreign key are satisfied. If certain conditions are met, then the condition logic 450 may control the partition logic 420 to create the reference partitioned table. If certain conditions are not met, then the condition logic 450 may control the partition logic 420 to not create the reference partitioned table.

System 400 may also include a concurrency logic 460. Concurrency logic 460 may determine that a data manipulation language (DML) statement is to be processed in the referenced table. Thus, concurrency logic 460 may take actions to preserve concurrency between the referenced table and the referencing table. These actions may include selectively performing the DML statement based, at least in part, on an evaluation of the value of consecutive probes for a key in the referenced table index.

Figure 5:
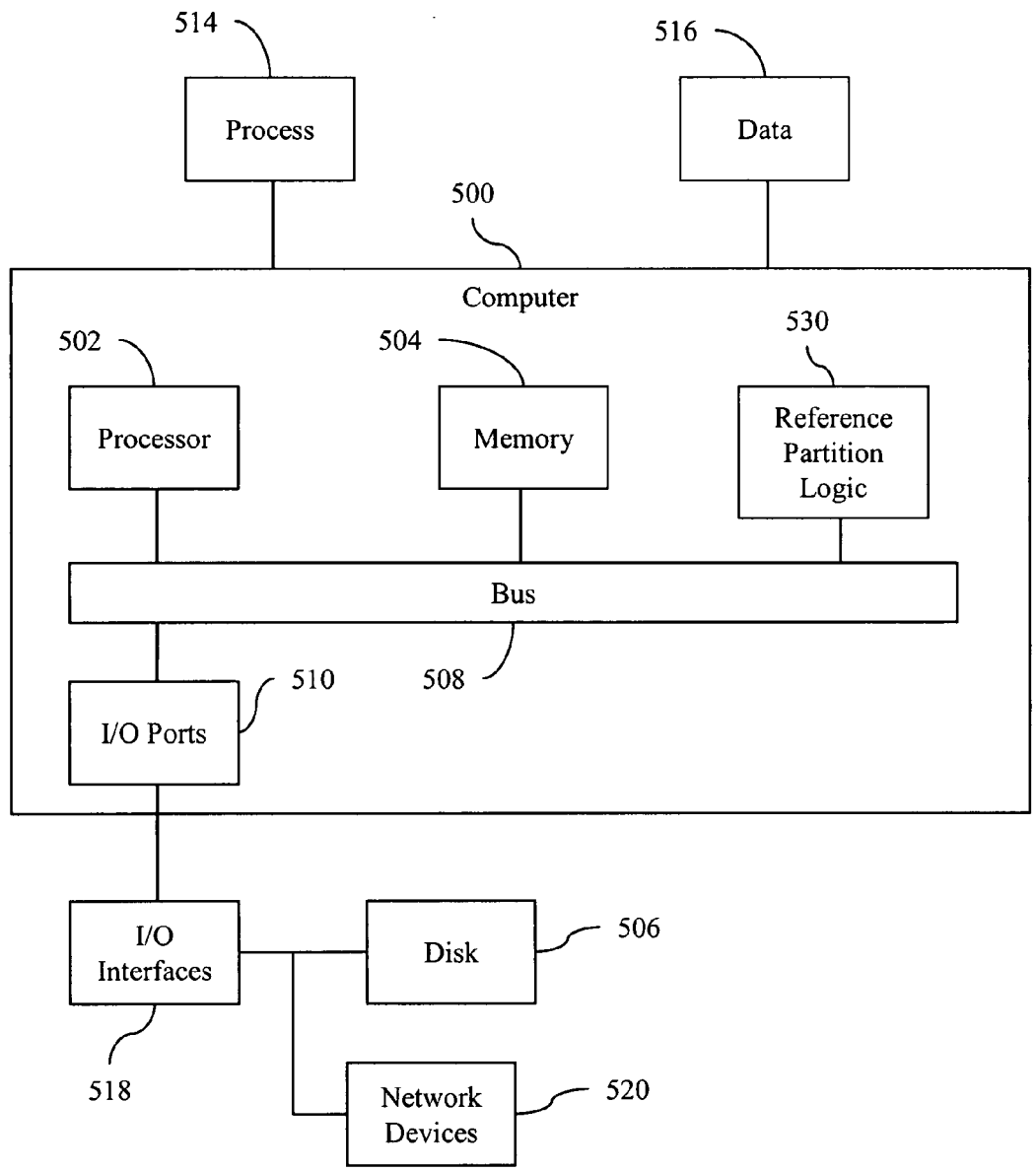
FIG. 5 illustrates an example computing environment in which example systems and methods illustrated herein can operate.

FIG. 5 illustrates an example computing device in which example systems and methods described herein, and equivalents, can operate. The example computing device may be a computer 500 that includes a processor 502, a memory 504, and input/output ports 510 operably connected by a bus 508.

In one example, the computer 500 may include a reference partition logic 530. In one example, logic 530 may include means (e.g., hardware, software in execution, firmware) for establishing a relationship between a first table and a second table using a referential constraint. The relationship may establish the first table and the second table as a parent/child pair or, more generally, as a referenced/referencing pair. Logic 530 may also include means (e.g., hardware, software in execution, firmware) for identifying a partitioning scheme associated with the first table. The partitioning scheme may be, for example, range partitioning, list partitioning, hash partitioning, and so on. Logic 530 may also include means (e.g., hardware, software in execution, firmware) for creating the second table as a reference partitioned table partitioned according to the partitioning scheme associated with the first table. The second table may be equi-partitioned with respect to the first table.

Generally describing an example configuration of the computer 500, the processor 502 can be a variety of various processors including dual microprocessor and other multiprocessor architectures. The memory 504 can include volatile memory and/or non-volatile memory. The non-volatile memory can include, but is not limited to, ROM, PROM, and so on. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 506 may be operably connected to the computer 500 via, for example, an input/output interface (e.g., card, device) 518 and an input/output port 510. The disk 506 can be, for example, a magnetic disk drive, a solid state disk drive, a floppy disk drive, a tape drive, a Zip drive, a flash memory card, a memory stick, and so on. Furthermore, the disk 506 may be an optical drive (e.g., CD-ROM, CD recordable drive (CD-R drive), CD rewriteable drive (CD-RW drive), digital video ROM drive (DVD ROM)). The memory 504 can store processes 514 and/or data 516, for example. The disk 506 and/or memory 504 can store an operating system that controls and allocates resources of the computer 500. Disk 506 and/or memory 504 may also store data 516.

The bus 508 can be a single internal bus interconnect architecture and/or other bus or mesh architectures. While a single bus is illustrated, it is to be appreciated that computer 500 may communicate with various devices, logics, and peripherals using other busses that are not illustrated (e.g., PCIE, SATA, Infiniband, 1394, USB, Ethernet). The bus 508 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 500 may interact with input/output devices via i/o interfaces 518 and input/output ports 510. Input/output devices can include, but are not limited to, a keyboard, a microphone, a pointing and selection device, cameras, video cards, displays, disk 506, network devices 520, and so on. The input/output ports 510 can include but are not limited to, serial ports, parallel ports, and USB ports.

The computer 500 can operate in a network environment and thus may be connected to network devices 520 via the i/o devices 518, and/or the i/o ports 510. Through the network devices 520, the computer 500 may interact with a network. Through the network, the computer 500 may be logically connected to remote computers. The networks with which the computer 500 may interact include, but are not limited to, a local area network (LAN), a wide area network (WAN), and other networks. The network devices 520 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and so on. Similarly, the network devices 520 can connect to WAN technologies including, but not limited to, point to point links, circuit switching networks (e.g., integrated services digital networks (ISDN), packet switching networks, digital subscriber lines (DSL)).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A computer-readable medium storing processor executable instructions that when executed by a processor cause the processor to perform a method, the method comprising:

identifying a partitioning strategy associated with a parent table, the parent table being associated with a referential constraint, the parent table being a database table in a relational database; and creating a child table related to the parent table by the referential constraint, the child table being a database table in the relational database, where the child table is partitioned using the partitioning strategy associated with the parent table, and where the child table does not replicate a partition key of the parent table.

2. The computer-readable medium of claim 1, where the child table is equi-partitioned with respect to the parent table.

3. The computer-readable medium of claim 1 including:

receiving a create table statement having a partition by reference clause that identifies the parent table using the referential constraint.

4. The computer-readable medium of claim 1, where creating the child table includes manipulating an identifier associated with the referential constraint to identify a partition key in the parent table.

5. The computer-readable medium of claim 4, where the child table inherits a partition key associated with the parent table through a foreign key associated with the referential constraint.

6. The computer-readable medium of claim 1, including receiving a partition maintenance operation (PMO) associated with the parent table and selectively cascading the PMO to the child table, where the cascading is to be performed atomically and automatically.

7. The computer-readable medium of claim 6, the PMO being one of, a move operation, a truncate operation, an exchange operation, a split operation, a merge operation, an add operation associated with a hash partition, a coalesce operation associated with a hash partition, an add operation associated with a range, an add operation associated with a list, and a drop operation.

8. The computer-readable medium of claim 6, where the PMO is performed first in the parent and then in the child, and where neither the PMO performed in the parent nor the PMO performed in the child is committed until both of the PMO are complete.

9. The computer-readable medium of claim 6, including:
creating a temporary table associated with the parent table;
updating a log that tracks where the PMO had an effect in the parent table;
performing a join between the temporary table and the child table on the partition key;
acquiring partition information from the join; and
maintaining equi-partitioning of the child table with respect to the parent table based on the partition information.

10. The computer-readable medium of claim 1, including automatically cascading to the child table a row migration operation performed on the parent table.

11. The computer-readable medium of claim 10, where automatically cascading to the child table a row migration operation performed on the parent table includes executing a trigger upon determining that the row migration operation has been performed on the parent table.

12. The computer-readable medium of claim 1, including selectively preventing a PMO from operating directly on the child table.

13. A computer-readable medium storing processor executable instructions that when executed by a processor cause the processor to perform a method, the method comprising:
identifying a partitioning strategy associated with a parent table, the parent table being associated with a referential constraint, the parent table being a database table in a relational database;
determining that a set of conditions are satisfied before creating a child table, the set of conditions including:
determining that the referential constraint is enabled, validated and not deferrable;
determining that columns of a partitioning foreign key are constrained to have a value that is not null by enabled, validated, and not deferrable constraints;
determining that no columns of the partitioning foreign key are virtual columns;
determining that no columns of a parent key referenced by a partitioning constraint are virtual columns;
determining that if row movement is enabled in the parent table that row movement is enabled in the child table; and
determining that the parent table is not a domain index storage table; and
creating a child table related to the parent table by the referential constraint, the child table being a database table in the relational database, where the child table is partitioned using the partitioning strategy associated with the parent table, and where the child table does not replicate a partition key of the parent table.

14. A computer-readable medium storing processor executable instructions that when executed by a processor cause the processor to perform a method, the method comprising:
identifying a partitioning strategy associated with a parent table, the parent table being associated with a referential constraint, the parent table being a database table in a relational database;
determining that a set of conditions are satisfied before creating a child table, the set of conditions including:
determining that the parent table is heap-organized;
determining that the parent table is one of, range partitioned, list partitioned, hash partitioned, system partitioned, composite partitioned, and reference partitioned; and
creating a child table related to the parent table by the referential constraint, the child table being a database table in the relational database, where the child table is partitioned using the partitioning strategy associated with the parent table, and where the child table does not replicate a partition key of the parent table.

15. The computer-readable medium of claim 14, the method including determining that a set of conditions associated with a foreign key constraint are satisfied before creating the child table, the set of conditions including:
determining that the foreign key constraint is not a self-referential constraint;
determining that foreign key columns are constrained to have a value that is not null; and
determining that the foreign key constraint does not have delete set null semantics.

16. A computer-readable medium storing processor executable instructions that when executed by a processor cause the processor to perform a method, the method including:
identifying a partitioning strategy associated with a parent table, the parent table being associated with a referential constraint, the parent table being a database table in a relational database;
creating a child table related to the parent table by the referential constraint, the child table being a database table in the relational database, where the child table is partitioned using the partitioning strategy associated with the parent table, and where the child table does not replicate a partition key of the parent table; and
upon determining that a data manipulation language (DML) statement is being processed in the child table, probing for a key in a parent index;
acquiring a row identifier associated with the key;
acquiring a data object number associated with the row identifier;
determining a parent table partition associated with the DML statement based, at least in part, on the data object number;
determining a child table partition associated with the DML statement based, at least in part, on the parent table partition; and
selectively performing the DML statement in the parent table and the child table.

17. The computer-readable medium of claim 16, the method including:

repetitively probing the parent index;
selectively committing an operation on the parent table based, at least in part, on determining that consecutive values retrieved by probing the parent index are equivalent; and
selectively rolling back and retrying an operation on the parent table based, at least in part, on determining that consecutive values retrieved by probing the parent index are not equivalent.

18. The computer-readable medium of claim 1, the method including selectively partition pruning a reference partitioned table based, at least in part, on a query involving a predicate on the partition key.

19. The computer-readable medium of claim 1, the method including selectively performing a partition-wise join between a reference partitioned table and another table.

20. A system, comprising:
a relationship logic to identify a referenced table and to identify a partition scheme associated with the referenced table;
a partition logic, embodied as processor executable instructions stored on a computer-readable medium that when executed by a processor cause the processor to reference partition and equi-partition a referencing table related to the referenced table by a referential constraint, the referencing table being equi-partitioned with respect to the referenced table;
the referencing table being partitioned using the partitioning scheme associated with the referenced table, the referencing table not including a partitioning key in the referenced table; and
where the referential constraint including information for identifying a partitioning key in the referenced table.

21. The system of claim 20, including an SQL logic to receive an SQL create table statement including a partition by reference clause that identifies the referential constraint.

22. The system of claim 21, including a partition maintenance operation (PMO) logic to atomically and automatically selectively cascade a PMO operation performed on the referenced table to the referencing table and to selectively block a PMO operation from being performed directly on the referencing table.

23. The system of claim 22, including a condition logic to selectively control the partition logic based, at least in part, on determining whether a set of conditions are satisfied, the set of conditions including:
determining whether the referential constraint is enabled, validated and not deferrable;
determining whether columns of a foreign key are constrained to be not null by enabled, validated, and not deferrable constraints;
determining whether any columns of the foreign key are virtual columns;
determining whether any columns of the reference key are virtual columns;
determining whether row movement is enabled in both the referenced table and the referencing table;
determining whether the referenced table is a domain index storage table;
determining whether the referenced table is heap-organized;
determining whether the referenced table is one of, range partitioned, list partitioned, hash partitioned, system partitioned, composite partitioned, and reference partitioned;
determining whether the foreign key constraint is not a self-referential constraint;
determining whether foreign key columns are constrained to be not null; and
determining whether the foreign key constraint has delete set null semantics.

24. The system of claim 23, including a concurrency logic to determine that a data manipulation language (DML) statement is being processed in the referenced table and to preserve concurrency between the referenced table and the referencing table by selectively performing the DML statement, where the DML statement is performed selectively based, at least in part, on an evaluation of the value of consecutive probes for a key in the referenced table index.

25. A system, comprising:
means for establishing a relationship between a parent table and a child table using a referential constraint;
means for identifying a partitioning scheme associated with the parent table; and
means for reference-partitioning the child table according to the partitioning scheme associated with the parent table, the child table being equi-partitioned with respect to the parent table.

26. A method comprising:
identifying a partitioning strategy associated with a parent table, the parent table being associated with a referential constraint, the parent table being a database table in a relational database;
creating a child table related to the parent table by the referential constraint, the child table being a database table in the relational database, where the child table is partitioned using the partitioning strategy associated with the parent table, and where the child table does not replicate a partition key of the parent table; and
storing the child table in electronic form in a database.

27. The method of claim 26, including:
receiving a create table statement having a partition by reference clause that identifies the parent table using the referential constraint.

28. The method of claim 26, where the child table inherits a partition key associated with the parent table through a foreign key associated with the referential constraint.

29. The method of claim 26, including receiving a partition maintenance operation (PMO) associated with the parent table and selectively cascading the PMO to the child table, where the cascading is to be performed atomically and automatically.

30. The method of claim 26, including automatically cascading to the child table a row migration operation performed on the parent table.

31. The method of claim 26, including selectively preventing a PMO from operating directly on the child table.

32. The method of claim 26, the method including determining that a set of conditions are satisfied before creating the child table, the set of conditions including:
determining that the referential constraint is enabled, validated and not deferrable;
determining that columns of a partitioning foreign key are constrained to be not null by enabled, validated, and not deferrable constraints;
determining that no columns of the partitioning foreign key are virtual columns;
determining that no columns of a parent key referenced by a partitioning constraint are virtual columns;
determining that if row movement is enabled in the parent table that row movement is enabled in the child table; and
determining that the parent table is not a domain index storage table.

33. The method of claim 26, the method including determining that a set of conditions are satisfied before creating the child table, the set of conditions including:
   determining that the parent table is heap-organized; and
   determining that the parent table is one of, range partitioned, list partitioned, hash partitioned, system partitioned, composite partitioned, and reference partitioned.

34. The method of claim 33, the method including determining that a set of conditions associated with a foreign key constraint are satisfied before creating the child table, the set of conditions including:
   determining that the foreign key constraint is not a self-referential constraint;
   determining that foreign key columns are constrained to be not null; and
   determining that the foreign key constraint does not have delete set null semantics.

35. The method of claim 26, including:
   upon determining that a data manipulation language (DML) statement is to be processed in the child table, probing for a key in a parent index;
   acquiring a row identifier associated with the key;
   acquiring a data object number associated with the row identifier;
   determining a parent table partition associated with the DML statement based, at least in part, on the data object number;
   determining a child table partition associated with the DML statement based, at least in part, on the parent table partition; and
   selectively performing the DML statement in the parent table and the child table.

36. The method of claim 35, the method including:
   repetitively probing the parent index;
   selectively committing an operation on the parent table based, at least in part, on determining that consecutive values retrieved by probing the parent index are equivalent; and
   selectively rolling back and retrying an operation on the parent table based, at least in part, on determining that consecutive values retrieved by probing the parent index are not equivalent.

* * * * *